(12) United States Patent
Raghupathi

(10) Patent No.: US 12,393,646 B2
(45) Date of Patent: Aug. 19, 2025

(54) GENERATING NOTIFICATIONS THROUGH CHART PATTERN DETECTION

(71) Applicant: SAP SE, Walldorf (DE)

(72) Inventor: Krishnan Raghupathi, Bangalore (IN)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 18/356,870

(22) Filed: Jul. 21, 2023

(65) Prior Publication Data

US 2025/0028789 A1 Jan. 23, 2025

(51) Int. Cl.
*G06F 16/24* (2019.01)
*G06F 16/55* (2019.01)
*G06F 18/2415* (2023.01)

(52) U.S. Cl.
CPC ......... *G06F 18/2415* (2023.01); *G06F 16/55* (2019.01)

(58) Field of Classification Search
None
See application file for complete search history.

(56) References Cited

U.S. PATENT DOCUMENTS

| | | | |
|---|---|---|---|
| 7,599,867 B1 * | 10/2009 | Monroe | G06Q 20/10 382/181 |
| 2017/0339290 A1 * | 11/2017 | Kim | H04N 1/00037 |
| 2021/0327061 A1 * | 10/2021 | Clymer | G06V 20/698 |
| 2021/0343055 A1 * | 11/2021 | Zhang | G06V 10/22 |
| 2021/0377203 A1 * | 12/2021 | Hou | H04L 67/306 |

FOREIGN PATENT DOCUMENTS

| | | | | |
|---|---|---|---|---|
| CN | 107688788 B | * | 1/2021 | ......... G06K 9/00456 |
| CN | 114722228 A | * | 7/2022 | |
| CN | 116563872 B | * | 1/2024 | ........... G06V 10/764 |

OTHER PUBLICATIONS

Automatic Data Extraction from 2D and 3D Pie Chart Images, De et al (Year: 2018).*
Chart Classification by Combining Deep Convolutional Networks and Deep Belief Networks, Liu et al (Year: 2015).*

* cited by examiner

*Primary Examiner* — Augustine K. Obisesan
(74) *Attorney, Agent, or Firm* — Fountainhead Law Group, PC

(57) ABSTRACT

Embodiments utilize pattern recognition to generate notifications in connection with analytical applications. A dashboard of the analytical dashboard is scanned to intake charts of data therefrom. Images of the charts are created, and then matched with repository patterns of a trained deep transfer model (such as a Convolutional Neural Network model). Upon matching of a pattern by the model, an alert is generated and communicated to a user to indicate a trend in the analytical data. In this manner, embodiments automatically detect data trends based upon their visual appearance when plotted in a chart, rather than through resource-intensive analysis of individual data point values. In specific embodiments, the pattern recognition may be implemented by an in-memory database engine of an in-memory database responsible for storing charts and/or chart images and/or the repository. In some embodiments, recognition of patterns in chart images may be implemented by a service.

20 Claims, 9 Drawing Sheets

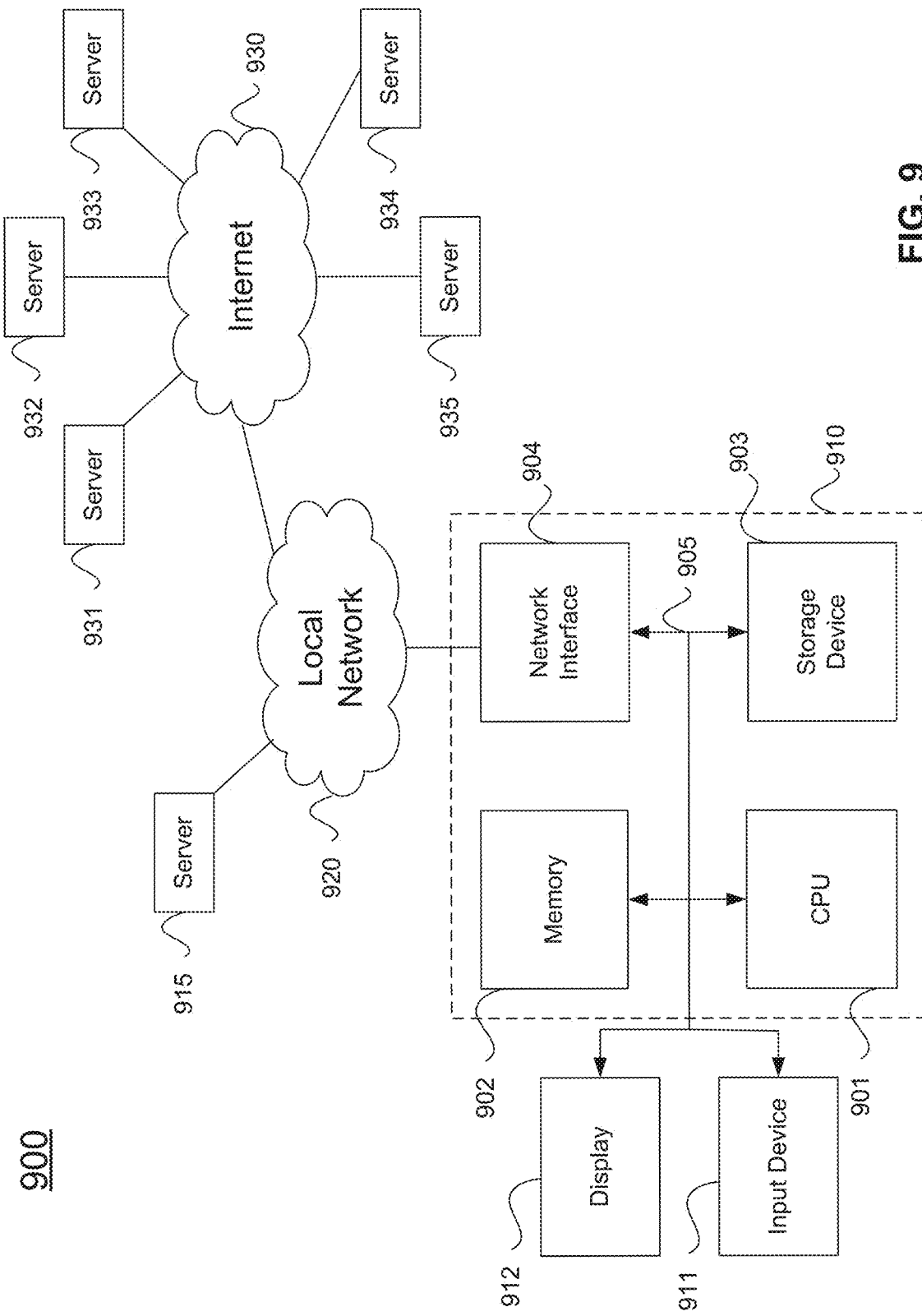

GENERATING NOTIFICATIONS THROUGH CHART PATTERN DETECTION

BACKGROUND

Unless otherwise indicated herein, the approaches described in this section are not prior art to the claims in this application and are not admitted to be prior art by inclusion in this section.

Analysts may depend upon data presented in dashboard views, in order to perform decision-making for in variety of different knowledge domains. Examples can include but are not limited to health care and financial forecasting.

However, an analyst's ability to rapidly make accurate decisions, can be affected by the sheer volume of data being presented in the dashboard. In particular, the increasing prevalence of big data flows can render effective analysis more difficult and time-consuming.

SUMMARY

Embodiments utilize pattern recognition to generate notifications in connection with analytical applications. A dashboard of the analytical application is scanned to intake charts of data therefrom. Images of the charts are created, and then matched with repository patterns by a trained deep transfer model (such as a Convolutional Neural Network model). Upon matching of a pattern by the model, an alert is generated and communicated to a user to indicate a trend in the analytical data. In this manner, embodiments automatically detect data trends based upon their visual appearance when plotted in a chart, rather than through resource-intensive analysis of individual data point values. In specific embodiments, the pattern recognition may be implemented by an in-memory database engine of an in-memory database responsible for storing charts and/or chart images and/or the repository. In some embodiments, recognition of patterns in chart images may be implemented by a service.

The following detailed description and accompanying drawings provide a better understanding of the nature and advantages of various embodiments.

BRIEF DESCRIPTION OF THE DRAWINGS

FIG. 9 illustrates an example computer system.

DETAILED DESCRIPTION

Described herein are methods and apparatuses that implement notification generation based upon pattern recognition in charts. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
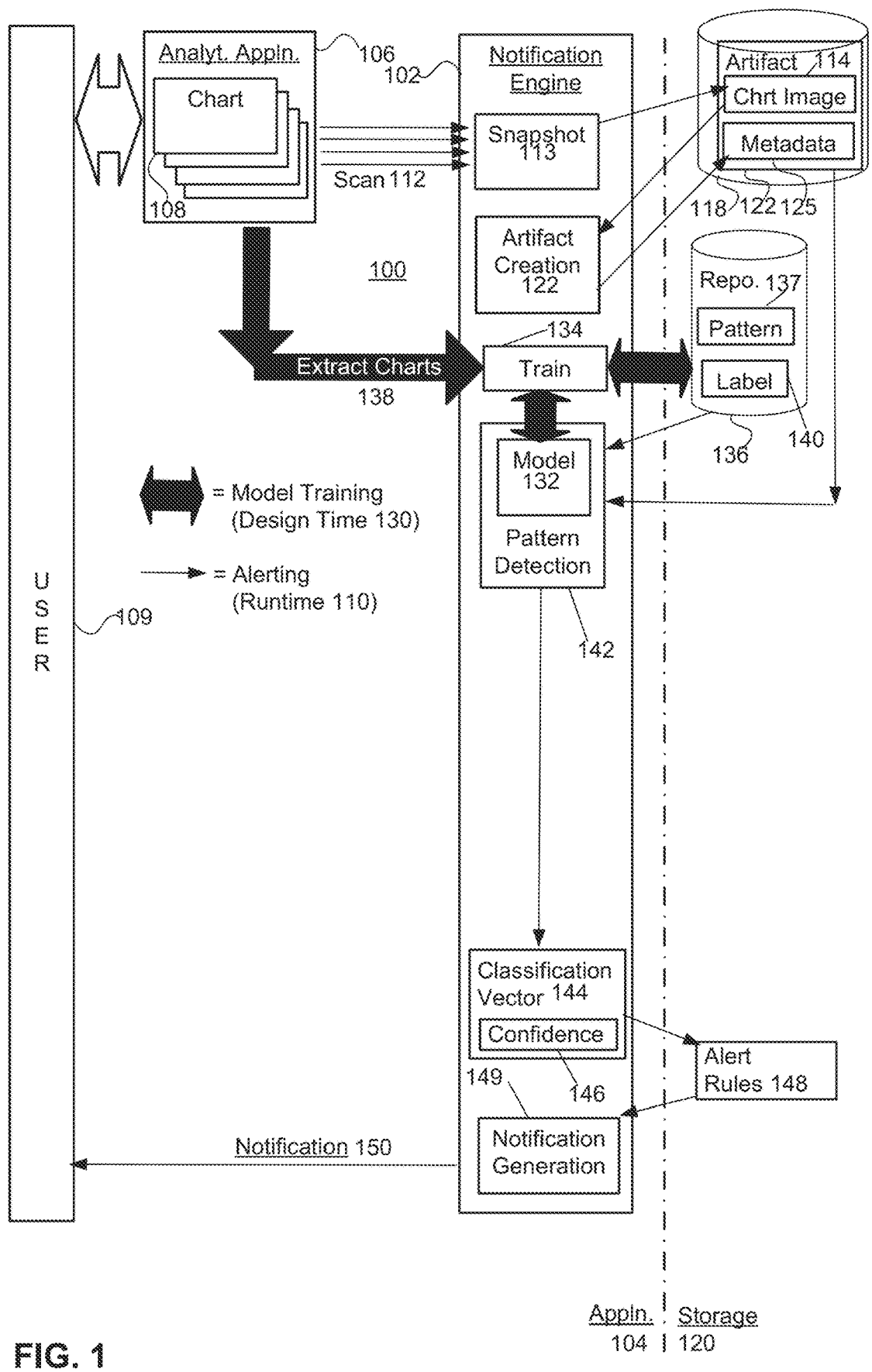
FIG. 1 shows a simplified diagram of a system according to an embodiment.

FIG. 1 shows a simplified view of an example system that is configured to implement alert generation according to an embodiment. Specifically, system 100 comprises a notification engine 102 located in application layer 104.

Analytics application 106 is also present within the application layer. Analytics application includes multiple charts 108 which it has created in order to visualize data for a user 109. Those charts may be present, e.g., within a dashboard of the analytics application.

During runtime 110, the notification engine is configured to scan 112 the analytics application and intake charts therefrom (e.g., from the dashboard). Depending upon the particular embodiment, such scanning may take place on a scheduled basis, or may automatically take place upon the creation of a new chart or modification of an existing chart.

Figure 2:
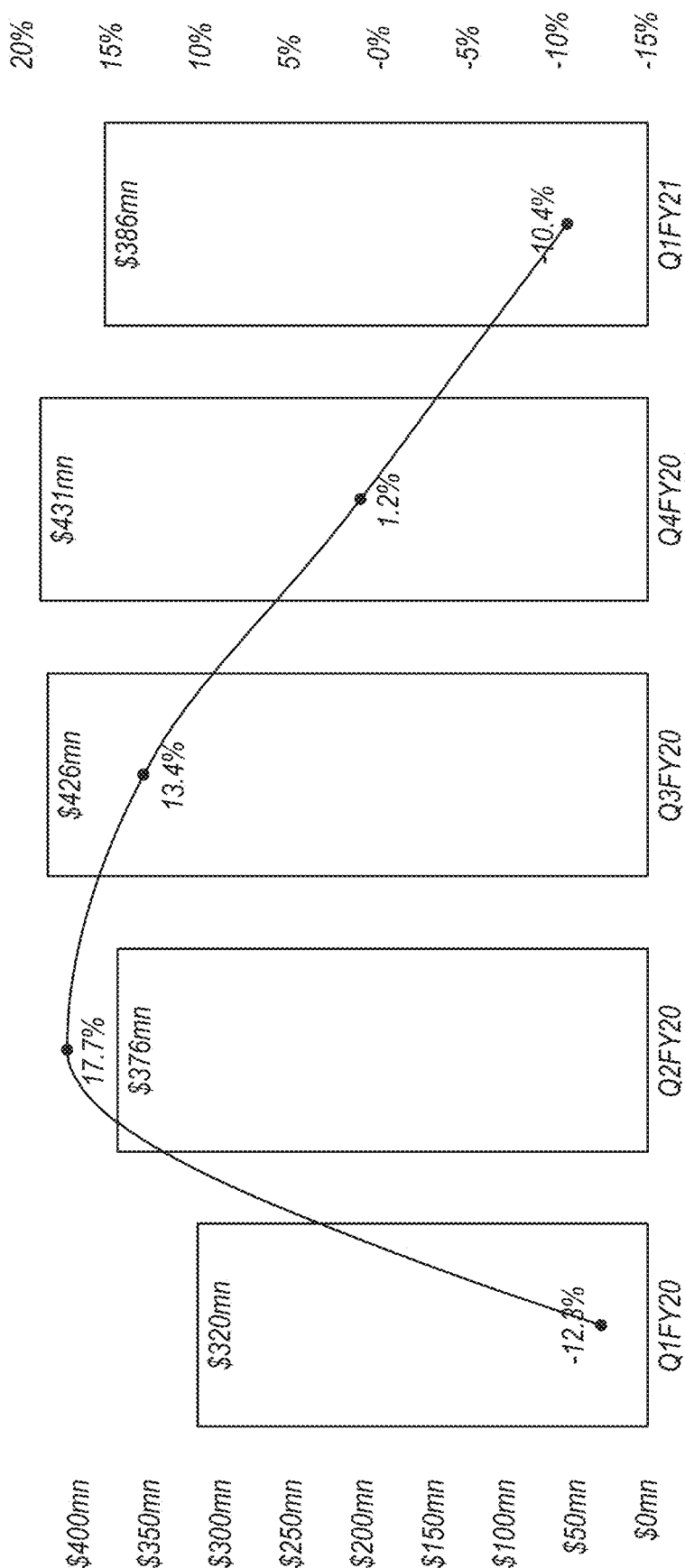
FIG. 2 shows a simplified chart according to an embodiment.

FIG. 2 shows one particular example of a chart that may be received from a dashboard according to a particular embodiment. This specific chart plots net income and sales revenue (Y-axes) per quarter (X-axis).

This data from the chart of FIG. 2 shows decreasing sales revenue after Q2FY20. The information in this chart may offer potentially actionable insights regarding Key Performance Indicators (KPIs) in a manner that is helpful to the user.

Moreover, the visual shape offered by the chart of FIG. 2 may be recognizable and allow for rapid assessment of a trend by the user. Accordingly, the notification engine takes a snapshot 113 of the incoming charts in order to create corresponding chart images 114.

The image of the chart may be in one or more formats. Examples of such image formats can include but are not limited to:
  Joint Photographic Experts Group (JPEG or JPG)
  Portable Network Graphics (PNG)
  Graphics Interchange Format (GIF)
  Tagged Image File (TIFF)
  Photoshop Document (PSD)
  Portable Document Format (PDF)
  Encapsulated Postscript (EPS)
  Adobe Illustrator Document (AI)
  Adobe Indesign Document (INDD)
  Raw Image Formats (RAW).

The chart images are stored within database 118 of storage layer 120. Moreover, the chart images are subject to further processing to create 122 artifacts 124 therefrom.

The artifacts that are stored in the database, include the chart image as well as metadata 125 associated therewith. A variety of different types of information can be stored in the metadata of the artifact. Examples of such information can include but are not limited to one or more of:
  identifier of a chart;
  chart axis names;
  identifier of a dashboard;
  frequency of scanning;

Moreover, the metadata of an artifact can be supplemented and updated with additional information relevant to alert generation. In particular, some of this metadata may result from application of a deep transfer model to the chart image, to generate a match with a pattern known to be critical in a particular domain, and potentially indicative of valuable trend(s). Such metadata can include but is not limited to:
- name of a matched domain-critical pattern (e.g., revenue decline; cup-and-handle);
- user notification details;
- confidence threshold (e.g., in %).

In particular, during an earlier design time 130, the notification engine has created a deep transfer model 132. That deep transfer model is trained 134 based upon a repository 136 of patterns in 137 chart images that are known to indicate trends in data.

As part of the training, charts are extracted 138 from dashboard(s), and images are created therefrom. The training corpus includes labels 140 associated with the patterns by experts knowledgeable regarding the particular domain in question.

Returning now to runtime, the artifacts (including the images) are fed to the trained deep transfer model in order to perform pattern detection 142. The result of processing of an artifact by the deep transfer model, is a classification vector 144.

One dimension of a classification vector can comprise a confidence 146 (expressed, e.g., in a percentage) regarding the accuracy of the match by the model with a pattern present in the repository. As mentioned above, that confidence may be stored as metadata with the artifact.

Where appropriate, the classification vector can trigger the application of alert rules 148 to generate 149 a notification 150. The alert rules can determine characteristics of a notification that is to be sent (by referencing, e.g., metadata of the artifact). Such notification characteristics can include but are not limited to one or more of
- notification recipient(s);
- notification urgency;
- notification repetition;
- notification format and content;
- channel of communication of notification (e.g., text, email, chat, other).

Notification generation that is performed according to various embodiments may offer one or more benefits. Specifically, one possible benefit is the rapid and accurate detection of domain-critical patterns arising in the dashboard of an analytics application, with reduced burden upon the user. That is, the user does not need to manually inspect the specific data present in every chart in order to recognize possibly actionable trends.

Another possible benefit is the ability to construct and maintain a repository of past-arising domain-specific patterns, that may be valuable for recognition and action. In this way, the user can be informed not just about historically important data, but also the visual patterns arising from such historically important data.

Still another possible benefit arises from the use of machine learning to recognize patterns arising in masses of data. In this manner, the limited resources of domain experts can be leveraged into effective recognition of important trends across large volumes of data.

Figure 3:
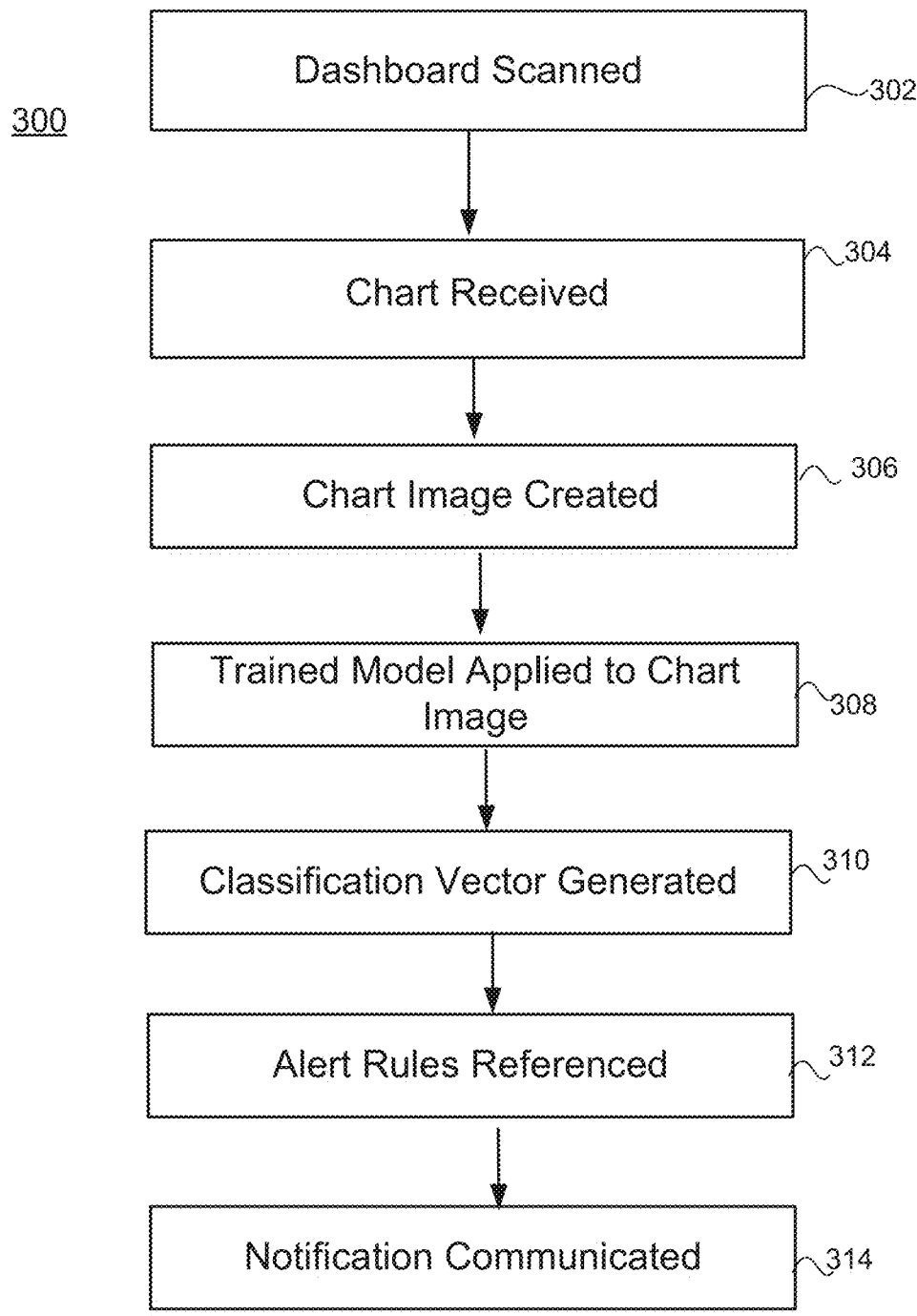
FIG. 3 shows a simplified flow diagram of a method according to an embodiment.

FIG. 3 is a flow diagram of a method 300 according to an embodiment. At 302, a dashboard is scanned.

At 304, in response to the scanning, a chart is received. At 306, an image of the chart is created.

At 308, a trained model is applied to match the chart image with a pattern in a repository. At 310, a classification vector is generated from the matching.

At 312, alert rules are referenced to generate a notification from the classification vector. At 314, the notification is communicated to a recipient.

Further details regarding alert generation according to various embodiments, are now provided in connection with the following example. In this particular example, alert generation is implemented in connection with the domain of stock purchasing, with trained Convolutional Neural Network (CNN) model(s) utilized as the deep transfer model.

EXAMPLE

Figure 4:
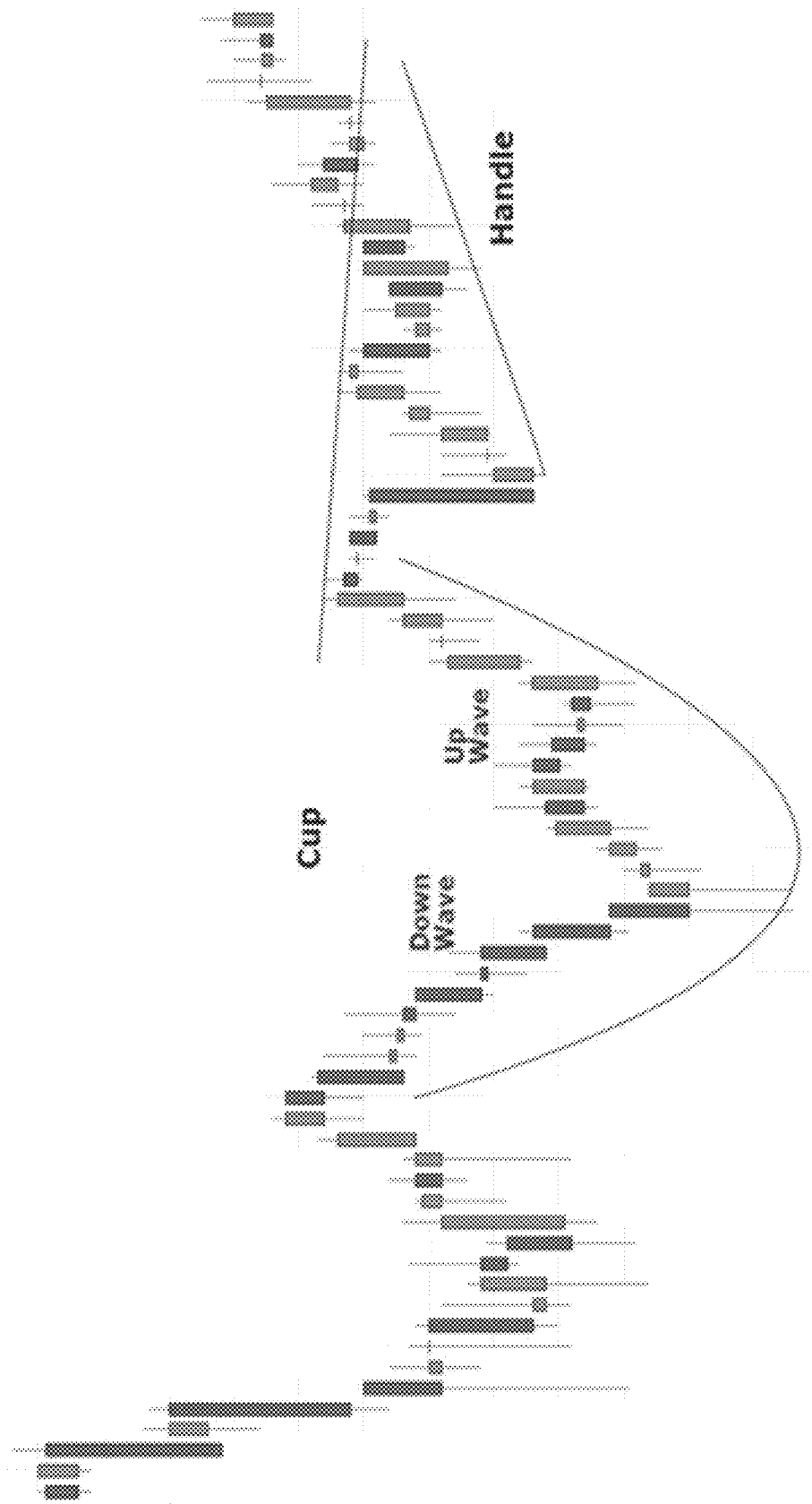
FIG. 4 shows a simplified chart according to an example.

FIG. 4 is a sample chart that plots the price (Y-axis) of a listed share over time (X-axis). In this chart, a cup-and-handle visual pattern is apparent.

Such a cup-and-handle visual pattern may be understood as a bullish signal extending an uptrend. For example, a trader may seek to recognize this pattern as an indicator, in order to place a stop buy order.

Figure 5:
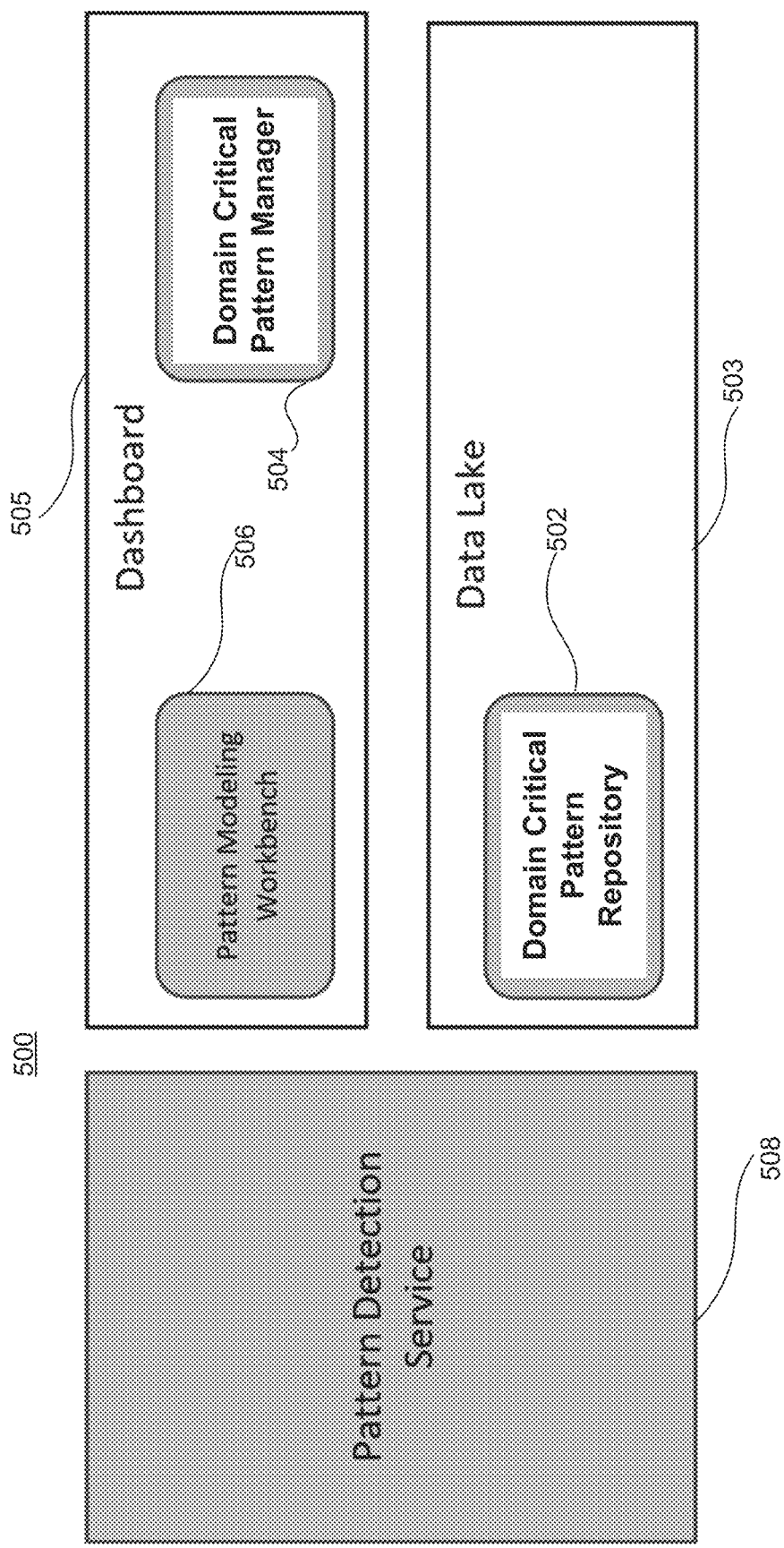
FIG. 5 shows an example of a system implementing notification generation according to the example.

Accordingly, FIG. 5 shows a simplified architectural overview of a system that is configured to recognize a visual pattern in a chart and issue a corresponding alert. In particular, the system 500 comprises a domain-critical pattern repository 502 within a data lake 503. This is a repository of chart screenshot images that are labelled and tagged with the identified domain critical pattern.

The system of FIG. 5 further includes a domain critical pattern manager 504 within dashboard 505. This element supports the creation and management of domain-critical pattern artifacts.

The system of FIG. 5 also includes a pattern modeling workbench 506. This is a Machine Learning-based workbench for the development, training and deployment of image recognition models. Those models can detect domain critical patterns from charts that are embedded within analytics dashboards.

The system of FIG. 5 further includes pattern detection service 508. This element comprises a runtime engine that scans the analytics dashboard(s), and determines the presence of a pattern within charts residing in those dashboards.

Details regarding the domain critical pattern repository according to this example, are now provided. This embodiment utilizes trained image recognition models to look for patterns within the analytics dashboard(s).

The pattern repository may exhibit one or more support the following capabilities:
- allow subject matter experts to create and maintain labeled training data sets of chart images that identify a specific domain-critical pattern within the chart region;
- allow assignment and maintenance of pattern names to labelled training data sets.

Details regarding the domain critical pattern manager according to this example, are now provided. In this embodiment, a domain-critical pattern (DCP) within the analytical dashboard(s) can be searched for.

A domain-critical pattern (DCP) is an artifact that may one or more of the following:
- A. reference to a unique pattern name as defined in the business-critical pattern repository;
- B. references to the chart and dashboard to be scanned to detect occurrence of the pattern;
- C. frequency with which the pattern scanning should be carried out;
- D. user notification that should be generated whenever a pattern is found in the dashboard;

E. confidence percentage threshold to determine the accuracy of the pattern match.

The manager may support creation and maintenance of DCPs per the structure defined above.

Details regarding the pattern modeling workbench are now described. For this embodiment, accurate detection of user-defined domain critical patterns from chart images, involves a pattern modeling workbench with one or more of the following capabilities:

allow users to import training data sets for one or more business critical patterns from the business-critical pattern repository;

support the use of pre-trained CNN models (deep transfer models) to develop, train, and deploy models that can detect the DCPs within analytics dashboard(s).

Figure 6:
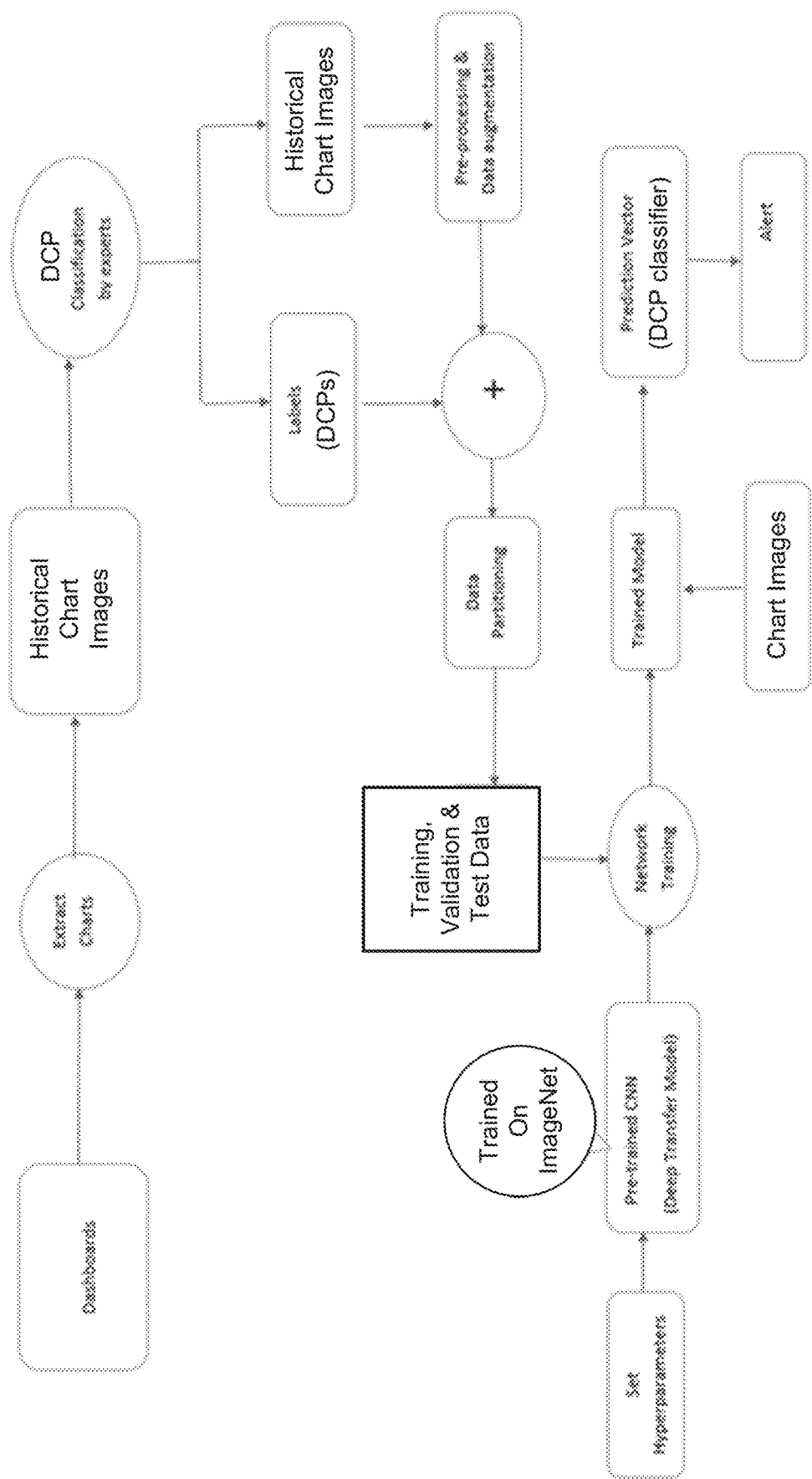
FIG. 6 shows a simplified flow diagram according to the example.

FIG. 6 is a simplified workflow of elements that can be implicated in alert generation according to this particular example.

Details regarding the pattern detection service of the embodiment of FIG. 5 are now described. The pattern detection service is a runtime engine that scans the analytics dashboards for DCPs, and generates user notifications whenever the patterns are found.

Figure 7:
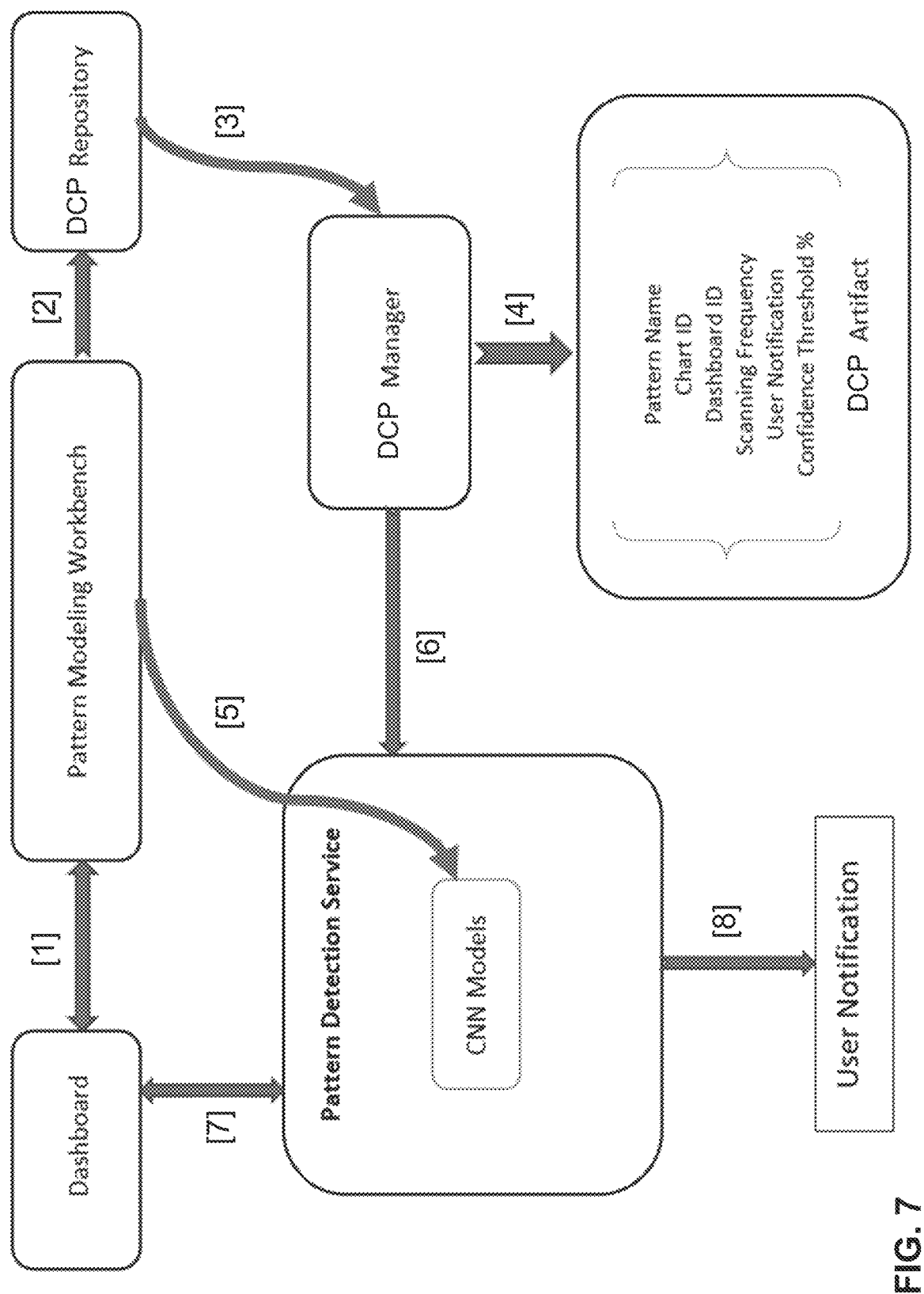
FIG. 7 is a simplified diagram showing interaction of a pattern detection service with repository, manager, and workbench according to the example.

The pattern detection service may perform these functions by interacting with the pattern repository, the pattern manager, and the pattern modeling workbench. The simplified schematic diagram of FIG. 7 provides a run-time view of this orchestration process.

Specifically, at [1] the pattern modeling workbench interacts with the analytical dashboards to extract snapshots of chart images. These snapshots form the basis of training data sets that are published to the DCP repository.

At [2] the pattern modeling workbench allows subject matter experts to annotate the domain-critical patterns in the chart regions, and then to subsequently publish the training data sets for pattern recognition to the DCP repository.

At [3] the DCP manager interacts with the DCP repository to support the creation and maintenance of DCP artifacts.

At [4] the DCP manager creates a DCP artifact having a specific defined structure.

At [5] the pattern modeling workbench generates trained CNN models, that are designed to detect the patterns as defined in a DCP artifact. These models are then deployed within the context of the pattern detection service.

At [6] the DCP manager registers the created DCP artifacts with the pattern detection service.

At [7] the pattern detection service monitors the analytical dashboard by taking screenshots of chart images. The pattern detection service prepares the extracted screenshots for pattern detection.

At [8] the pattern detection service uses the trained CNN models to detect the patterns corresponding to the defined DCP artifacts from the extracted screenshots. The pattern detection service in turn creates and issues the appropriate user notification based upon the defined confidence threshold percentage.

Using the system described in this example, trained CNN models may be developed and deployed to detect appearance of the cup and handle pattern in the trader's analytical dashboard. Based on the defined confidence threshold %, appropriate user notifications can be generated to allow the necessary action (e.g., issue stop hold order) to be taken.

Returning now to FIG. 1, there the particular embodiment is depicted with the notification engine as being located outside of the database. However, this is not required.

Rather, alternative embodiments could leverage the processing power of an in-memory database engine (e.g., the in-memory database engine of the HANA in-memory database available from SAP SE), in order to perform one or more various functions as described above. For example, one or more of the following could be stored in an in-memory database, and be processed by an in-memory database engine:

chart(s);
image(s);
model(s);
repositor(ies).

Figure 8:
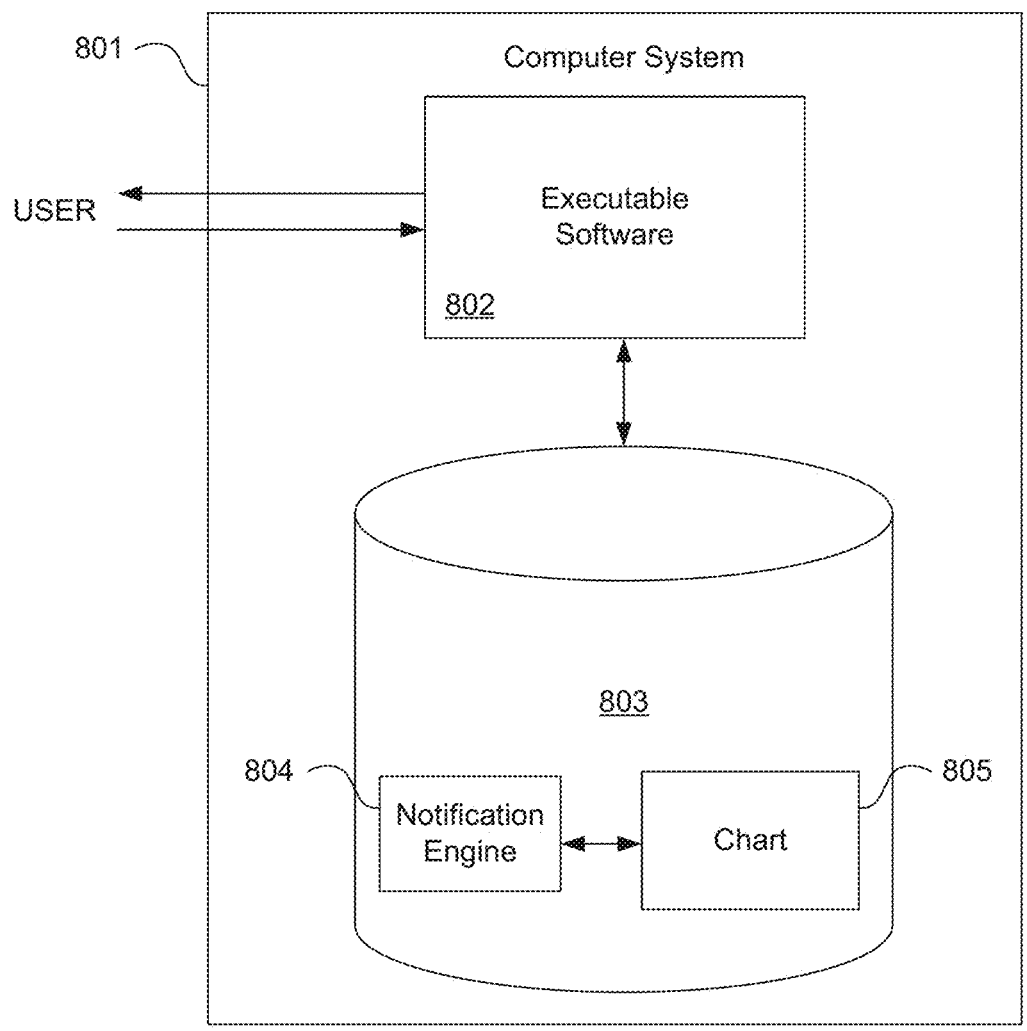
FIG. 8 illustrates hardware of a special purpose computing machine configured to implement notification generation according to an embodiment.

Thus FIG. 8 illustrates hardware of a special purpose computing machine configured to perform notification generation according to an embodiment. In particular, computer system 801 comprises a processor 802 that is in electronic communication with a non-transitory computer-readable storage medium comprising a database 803. This computer-readable storage medium has stored thereon code 805 corresponding to a notification engine. Code 804 corresponds to a chart or chart image. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1

Computer implemented systems and methods comprising:
scanning a dashboard of an analytics application;
receiving a chart in response to the scanning;
creating an image of the chart;
storing within a non-transitory computer readable storage medium, the chart image in an artifact comprising metadata;
applying a deep transfer model to match the chart image with a pattern present in a repository;
generating a classification vector from matching between the deep transfer model and the chart image;
referencing alert rules to generate a notification from the classification vector; and communicating the notification to a recipient.

Example 2

The computer implemented systems or methods of Example 1 further comprising training the deep transfer model by:
extracting historical charts from the analytics application;
taking images of the historical charts; and
associating domain-specific labels with the images of the historical charts,
wherein the classification vector is generated from the domain-specific labels and the metadata.

Example 3

The computer implemented systems or methods of any of Examples 1 or 2 wherein the deep transfer model comprises a Convolutional Neural Network (CNN) model.

Example 4

The computer implemented systems or methods of any of Examples 1, 2, or 3 wherein the classification vector comprises a confidence.

Example 5

The computer implemented systems or methods of any of Examples 1, 2, 3, or 4 wherein the metadata comprises a scanning frequency.

Example 6

The computer implemented systems or methods of any of Examples 1, 2, 3, 4, or 5 wherein the metadata identifies the dashboard.

Example 7

The computer implemented systems or methods of any of Examples 1, 2, 3, 4, 5, or 6 wherein the deep transfer model is applied to the chart image as a service.

Example 8

The computer implemented systems or methods of any of Examples 1, 2, 3, 4, 5, 6, or 7 wherein:
the non-transitory computer readable storage medium comprises an in-memory database; and
an in-memory database engine of the in-memory database applies the deep transfer model and generates the classification vector.

Example 9

The computer implemented systems or methods of Example 8 wherein:
the repository is also stored in the in-memory database; and
the in-memory database engine trains the deep transfer model from the repository.

An example computer system 900 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a Light Emitting Diode (LED) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:
1. A method comprising:
storing a plurality of patterns in a repository, each pattern including metadata comprising a reference to a unique pattern name, a reference to a chart in a dashboard of an analytic application to be monitored, and a confidence threshold;
scanning the dashboard of the analytics application;
creating a chart image of a first chart;

applying a deep transfer model to match the chart image with a first pattern of the plurality of patterns present in the repository based on the metadata;

generating a classification vector from matching between the deep transfer model and the chart image;

referencing a first confidence threshold of the first pattern to generate a notification from the classification vector; and communicating the notification to a recipient.

2. A method as in claim 1 further comprising training the deep transfer model by:

extracting historical charts from the analytics application;

taking images of the historical charts; and associating domain-specific labels with the images of the historical charts, wherein the classification vector is generated from the domain-specific labels and the metadata.

3. A method as in claim 2 wherein the plurality of patterns in the repository are generated from the images of the historical charts.

4. A method as in claim 1 wherein the classification vector comprises a confidence.

5. A method as in claim 1 wherein the metadata comprises a scanning frequency.

6. A method as in claim 1 wherein the metadata identifies the dashboard.

7. A method as in claim 1 wherein the deep transfer model is applied to the chart image as a service.

8. A method as in claim 1 wherein:

the non-transitory computer readable storage medium comprises an in-memory database; and an in-memory database engine of the in-memory database applies the deep transfer model and generates the classification vector.

9. A method as in claim 8 wherein:

the repository is also stored in the in-memory database; and the in-memory database engine trains the deep transfer model from the repository.

10. A non-transitory computer readable storage medium embodying a computer program for performing a method, said method comprising:

training a deep transfer model by:

extracting historical charts from an analytics application;

taking images of the historical charts; and associating domain-specific labels with images of the historical charts;

storing a plurality of patterns in a repository, each pattern including metadata comprising a reference to a unique pattern name, a reference to a chart in a dashboard of an analytic application to be monitored, and a confidence threshold;

scanning the dashboard of the analytics application;

creating a chart image of a first chart;

applying a deep transfer model to match the chart image with a first pattern of the plurality of patterns present in the repository based on the metadata;

generating a classification vector from matching between the deep transfer model and the chart image;

referencing a first confidence threshold of the first pattern to generate a notification from the classification vector; and communicating the notification to a recipient.

11. A non-transitory computer readable storage medium as in claim 10 wherein the classification vector comprises a confidence.

12. A non-transitory computer readable storage medium as in claim 10 wherein the deep transfer model comprises a Convolutional Neural Network.

13. A non-transitory computer readable storage medium as in claim 10 wherein the deep transfer model is applied as a service.

14. A non-transitory computer readable storage medium as in claim 10 wherein:

the non-transitory computer readable storage medium comprises an in-memory database; and an in-memory database engine of the in-memory database applies the deep transfer model and generates the classification vector.

15. A non-transitory computer readable storage medium as in claim 14 wherein:

the repository is stored in the in-memory database; and the in-memory database engine trains the deep transfer model.

16. A computer system comprising:

one or more processors;

a software program, executable on said computer system, the software program configured to cause an in-memory database engine of an in-memory database to:

store a plurality of patterns in a repository, each pattern including metadata comprising a reference to a unique pattern name, a reference to a chart in a dashboard of an analytic application to be monitored, and a confidence threshold;

scan the dashboard of the analytics application;

create a chart image of a first chart;

apply a deep transfer model to match the chart image with a first pattern of the plurality of patterns present in the repository based on the metadata;

generate a classification vector from matching between the deep transfer model and the chart image;

reference a first confidence threshold of the first pattern to generate a notification from the classification vector; and communicate the notification to a recipient.

17. A computer system as in claim 16 wherein the in-memory database engine is further configured to train the deep transfer model by:

extracting historical charts from the analytics application;

taking images of the historical charts; and associating domain-specific labels with the images of the historical charts, wherein the classification vector is generated from the domain-specific labels and the metadata.

18. A computer system as in claim 16 wherein the repository is stored in the in-memory database.

19. A computer system as in claim 16 wherein the classification vector comprises a confidence.

20. A computer system as in claim 16 wherein the deep transfer model comprises a Convolutional Neural Network (CNN) stored in the in-memory database.

* * * * *